(12) United States Patent
Peterson

(10) Patent No.: US 6,470,401 B1
(45) Date of Patent: Oct. 22, 2002

(54) SCHOOL COMPUTER SYSTEM HAVING SIMPLIFIED COMPUTER DEVICES FOR CLASSROOM DISTRIBUTION

(75) Inventor: Robert B. Peterson, Oak Park, IL (US)

(73) Assignee: C4SI, Inc., Oak Park, IL (US)

( * ) Notice: Subject to any disclaimer, the term of this patent is extended or adjusted under 35 U.S.C. 154(b) by 0 days.

(21) Appl. No.: 09/272,176

(22) Filed: Mar. 18, 1999

(51) Int. Cl.[7] .............................. G06F 1/16; G06F 1/18
(52) U.S. Cl. .................. 710/33; 709/213; 709/217; 709/219; 713/300
(58) Field of Search ................ 710/1, 33; 713/300; 709/217, 219, 213

(56) References Cited

U.S. PATENT DOCUMENTS

| | | | | |
|---|---|---|---|---|
| 5,519,641 A | * | 5/1996 | Beers et al. | 364/514 C |
| 5,868,575 A | * | 2/1999 | Kuczewski | 434/118 |
| 6,003,092 A | * | 12/1999 | Waters | 709/248 |
| 6,075,812 A | * | 6/2000 | Cafarella et al. | 375/206 |
| 6,114,632 A | * | 9/2000 | Planas, Sr. et al. | 174/117 R |
| 6,233,140 B1 | * | 5/2001 | Cummings et al. | 361/683 |

* cited by examiner

Primary Examiner—Jeffrey Gaffin
Assistant Examiner—Rehana Perveen
(74) Attorney, Agent, or Firm—Rothwell, Figg, Ernst & Manbeck

(57) ABSTRACT

A system and method of providing computer access in institutional environments, such as public schools, provides low cost, safe and secure simplified computing devices consisting of a motherboard, a display and an input device such as a keyboard, powered by a central power supply and networked through a dual purpose power and network data signal cable to a power supply/network hub. The hub receives line power from a building and receives network data signals from an application/data server.

9 Claims, 5 Drawing Sheets

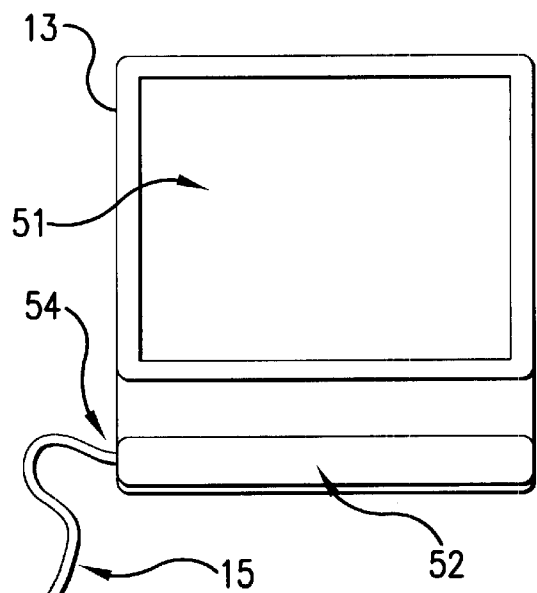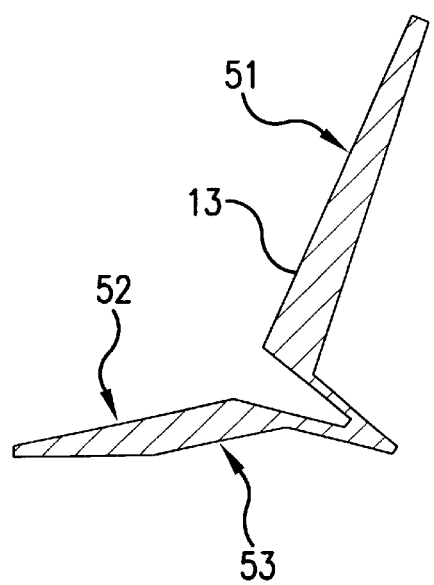
FIG.5A    FIG.5B
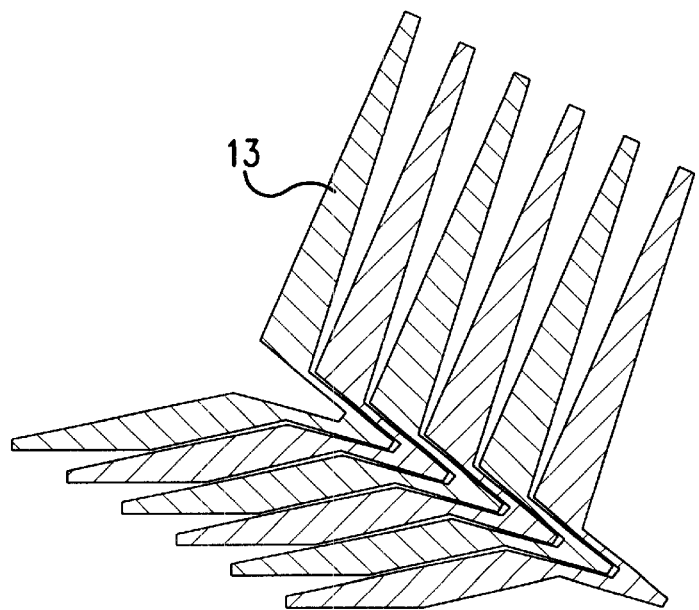
FIG.5C

SCHOOL COMPUTER SYSTEM HAVING SIMPLIFIED COMPUTER DEVICES FOR CLASSROOM DISTRIBUTION

A portion of the disclosure of this patent document contains material which is subject to copyright protection. The copyright owner has no objection to the facsimile reproduction by anyone of the patent document or the patent disclosure, as it appears in the Patent and Trademark Office patent file records, but otherwise reserves all copyrights whatsoever.

BACKGROUND OF THE INVENTION

1. Field of the Invention

The present invention relates generally to systems for interconnecting computers, and in particular to systems satisfying the perceived desirability of having computers readily available for student and teacher access in school settings. The present invention specifically addresses issues of cost, safety, loss prevention and infrastructure limitations that currently severely limit student and teacher access to computer technology, "electronic textbooks" and the Internet.

2. Background and Conventional Art

Presently severe limitations exist in schools with respect to computer access by students. These limitations include the relatively high cost of hardware, the lack of sufficient electrical power distribution capabilities, and the lack of sufficient communication network distribution capabilities in existing school buildings.

Access to computers and to computer networks in schools is generally provided in the form of computers installed in classroom settings or "laboratory" settings consisting of a number of computers located in one room with access and usage shared by several classes of students at different times. Both laboratory and classroom settings are considered viable for different uses; neither is necessarily preferable.

A typical classroom will have a single duplex electrical power outlet on each wall, with the possible exception of an outside window wall (which may have no outlets at all). With such insufficient power distribution, few electrical devices can be used in a classroom without the use of extension cords containing multiple power outlets, which can easily become safety hazards due to possible overloading, improper location, etc. The addition of power distribution requires costly professional installation by knowledgeable tradesmen and considerable disruption unless performed during non-school hours. Additionally, the installation of new power distribution outlets at fixed locations limits future options in classroom arrangements.

Computer network distribution in the classroom is typically more limited than electrical power distribution, with access typically being provided to a single location (i.e., device) in the classroom. Further distribution to additional devices would require the use of a hub device and cabling to each additional computer device desired to be wired for network access.

The setting up of a computer in any location requires one cable for electrical power and another cable to provide network data signals. When multiple computers in a classroom are necessary and the number of computers needed is greater than the existing classroom facility can handle, and/or the desired placement of the computers prevents access to existing power and network distribution, the difficulties are compounded.

Battery-powered computing devices are not currently a feasible option because of their higher cost and the increased amount of time, effort and cost required to maintain reliable functioning of such computing devices. Battery life is limited, and the length of time a battery can power a device before requiring a recharge is even more significantly limited. Thus, batteries would need to be frequently recharged and periodically replaced, adding labor and material costs to the cost of providing computer access in the classroom. A further shortcoming to such an approach is the fact that rechargeable batteries contain hazardous material that may be dangerous in a classroom where younger children may have access to such batteries, as well as being detrimental to the environment.

The use of standard multiple extension cords to provide power to convention desktop computers is a potential danger to students and staff for a variety of reasons, including potential fire hazards caused by improper connection of excessive numbers of computers to a single power source outlet, as well as the potential for accidents caused by potentially dangerous locating of power cords across walking paths.

To access a network, a second cable to the computer is needed. The current industry standard is the four-wire twisted pair 10/100BASE-T Ethernet cable with RJ45 terminations. Alternatives to the Ethernet cable, such as infrared and microwave wireless technologies, are not as reliable, safe, secure or as easy to administer. Such wireless technologies also are believed to present potential health risks to humans during prolonged exposure, which especially counsels against use of such potentially damaging technology in operating environments inhabited by children. Infrared signals also are sensitive to directional orientation and limited as to distance, diminishing their effectiveness in a classroom environment with high exposure to daylight.

Additional concerns are theft and security of installed school computer systems. Stand-alone computers are particularly at risk of being stolen. While there exist certain hard drive security codes designed to prevent unauthorized access to the hard drive of a computer, they serve only to protect the data on the hard drive and do not prevent the use of a stolen computer if the data on the hard drive is sacrificed.

What is needed is a system for providing computer access to a school classroom environment, which solves the problems of cost, safety, reliability and institutional structural limitations of the existing state of the art as described above.

SUMMARY OF THE INVENTION

The present invention provides a system and method which overcomes the above problems through the introduction of a central electrical power and network signal distribution device, a central management server device, a special cable device, and simplified computer devices designed to minimize cost.

According to one feature of the present invention multiple simplified computing devices are provided. These devices include only the essential display screen, motherboard and keyboard components. A preferred embodiment of a computing device used with the invention omits such items as hard drive, floppy drive, CD-ROM drive and power supply. The computing devices receive electrical power and network data signals through a single composite cable from a central power supply/network hub to which each computing device is connected. One or more remote and/or local servers are provided for furnishing applications, data, storage and data access.

The central hub includes connection terminals that provide the power and network signals necessary for multiple computing devices to operate. Each computing device according to the invention thus requires only a single connection to electrical line power and a single connection to the building data trunk or local server. Alternatively, for field use the computing devices can be powered by a mobile power source such as a 12V wet-cell battery, with a portable (laptop) computer being used as a server.

The simplified computing devices of the invention having no power supplies or data storage devices, are not stand-alone devices and are therefore virtually useless to anyone not having the external power supply or data server. The power supply/network hub device can be designed to be securely mounted to a wall and/or floor from inside the cabinet or housing of the hub device, with access to the cabinet being locked.

In particular, the present invention provides

BRIEF DESCRIPTION OF THE DRAWINGS

The present invention will become more clearly understood from the following detailed description in conjunction with the accompanying drawings, wherein:

FIGS. 5A–5C are views of the simplified computing device according to one preferred embodiment of the invention.

DETAILED DESCRIPTION OF THE PREFERRED EMBODIMENTS

Figure 1:
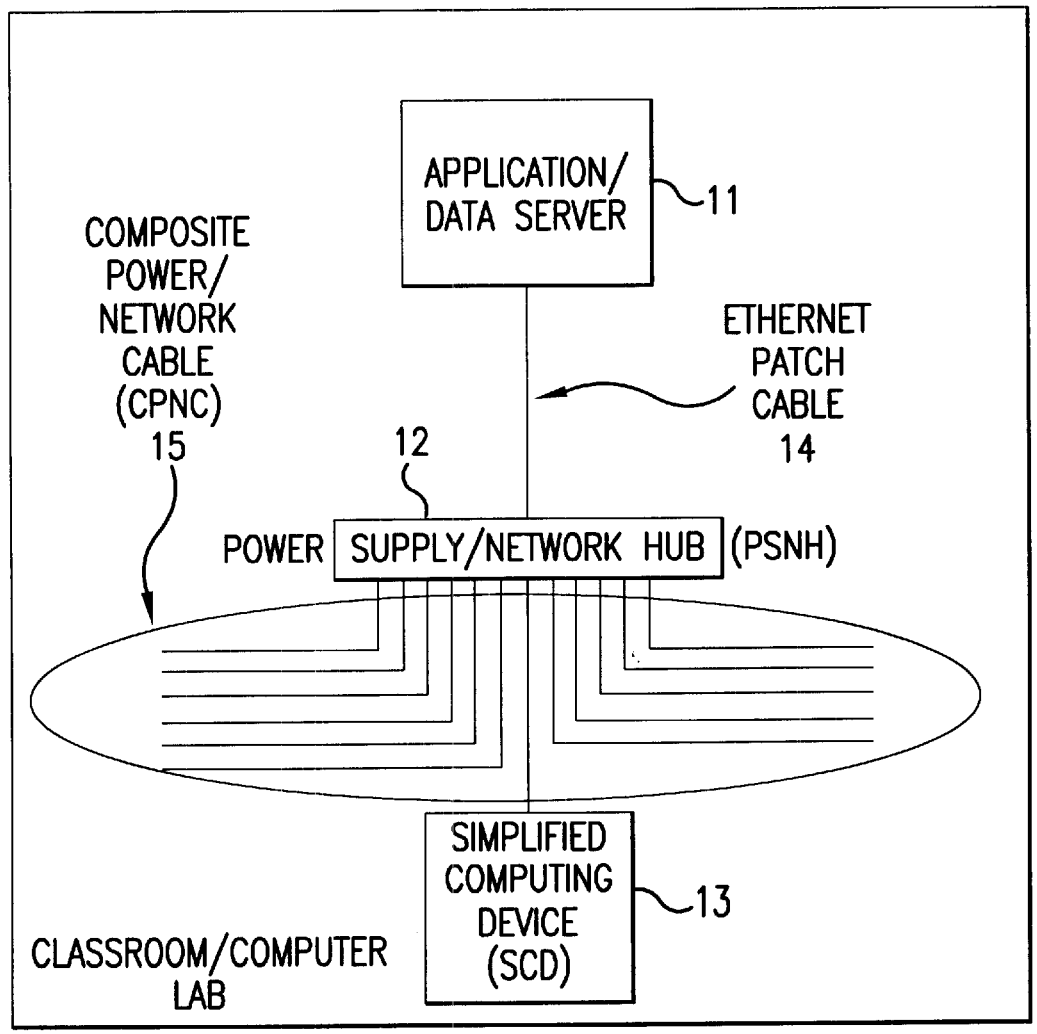
FIG. 1 is a schematic diagram of a self-contained computer system within a classroom/computer lab according to one preferred embodiment of the present invention.

FIG. 1 shows a self-contained computer system within a classroom/computer lab according to one preferred embodiment of the invention.

A Central Application/Data Server 11 (CADS) is any commonly available stand-alone computer with one or more data storage devices (e.g., hard drives), suitable to function as a server for the configuration into which it is installed. The CADS is connected to a Power Supply/Network Hub (PSNH) 12 by a standard network connection, such as a 10/100BASE-T Ethernet patch cable with RJ45 jacks both ends. The PSNH 12 is connected to the building line power in accordance with local building codes and standard good engineering practice. In a preferred embodiment, the PSNH 12 is located in a classroom and permanently secured to the building structure.

The PSNH 12 relays the network data signal from the CADS 11 and supplies low voltage operating power (from the power line source) via Composite Power/Network Cables (CPNC) 15 to a number of Simplified Computing Devices (SCD) 13, which are for student and teacher use. Any number of SCDs 13 can be connected to the PSNH 12 via corresponding CPNCs 15, limited only by the design and construction of the PSNH device itself.

Figure 2:
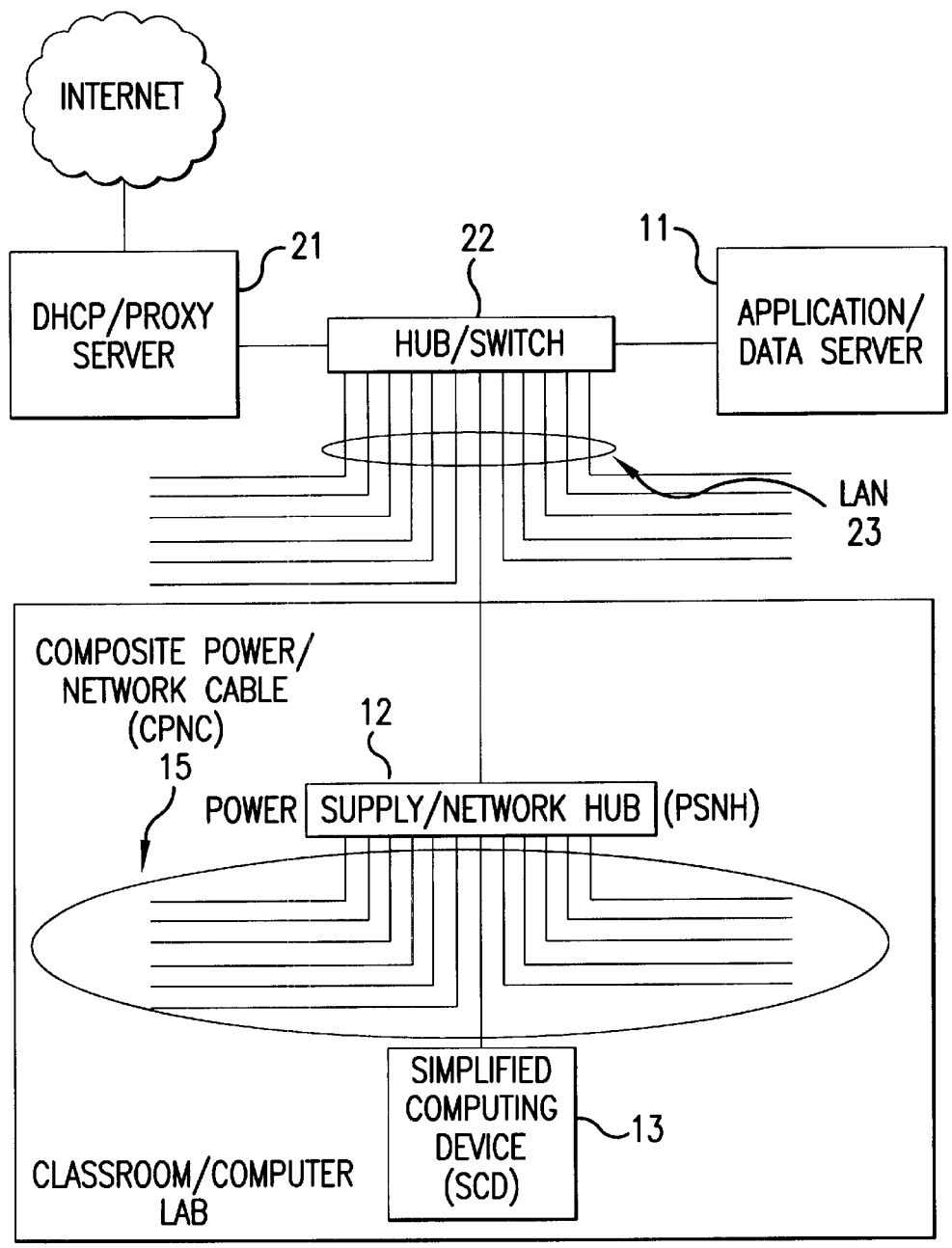
FIG. 2 is a schematic diagram of a self-contained computer system within a classroom/computer lab according to another preferred embodiment of the invention, which includes a DHCP Server, Internet access and "electronic textbook" capability.

FIG. 2 illustrates another preferred embodiment of the invention which includes a DHCP/proxy server, Internet access and capacity for "electronic textbook" applications.

The DHCP (Dynamic Host Configuration Protocol) server 21 is any DHCP/gateway/firewall/proxy server commercially available from manufacturers such as C4SI, Cisco Systems, etc. This server should have the capacity to manage the traffic demands of the school where it is installed and further have sufficient proxy storage to handle the "electronic textbook" demands of the school. The DHCP server 21 is connected to the CADS device 11 through a Hub/Switch 22. Hub/Switch 22 is any commercially available network switching device, such as a 10/100BASE-T Ethernet switch device commonly available from manufacturers such as 3Com, Intel and others, that manages and distributes network data signals.

LAN (Local Area Network) 23 is known in the art, and supplies network data signals from the Hub/Switch 22 to one or more Power Supply/Network Hubs (PSNH) 12. The PSNH 12 in turn relays the network data signals and supplies low voltage operating power via CPNC 15 to a number of SCDs 13. The operation of the system of FIG. 2 within the classroom/computer lab is similar to that of FIG. 1, with the exception that the local server is replaced by the combination of the Hub/Switch 22, the DHCP server 21, and the CADS 11.

Figure 3:
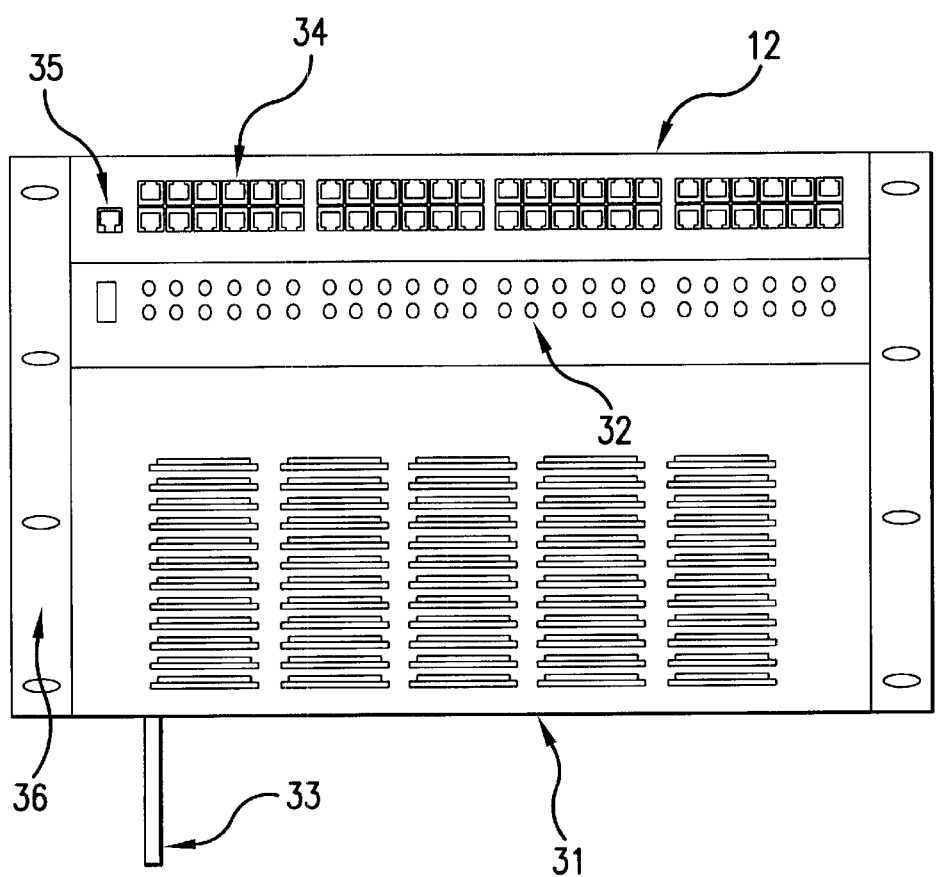
FIG. 3 is a plan view of the central power/network signal distribution hub device of FIGS. 1 and 2.

FIG. 3 is a detailed illustration of power supply/network hub (PSNH) 12. PSNH 12 contains a line power/12 volt DC power converter 31 which receives building line power from a pigtail connection 33 (or optionally through a hardwired connection) and converts it to deliver conditioned low voltage DC operating power to the SCDs 13 via a number of 12 volt jacks 32, one for each SCD 13, and further includes built-in UPS (Uninterruptible Power Supply) backup to assure reliable continued operation during shut-down periods in emergency situations.

The PSNH 12 also has a number of network output jacks 34 in sufficient number for each of the SCDs 13. A network input jack 35 is connected to a building network trunk. According to a preferred embodiment these jacks would be 10/100BASE-T Ethernet RJ45 jacks, but may be different as technology advances. Only one connection is necessary to standard building line power. There is also one connection to the data trunk (f) and provision for an optional connection to a local server. According to one embodiment, the PSNH 12 is secured to a wall via wall mounting flanges 36 provided on the housing of the PSNH 12.

The individual components used to assemble the PSNH all can be already engineered and tested components that are readily available at reasonable prices, although proprietary components of course could be substituted without departing from the scope of the invention.

Figure 4:
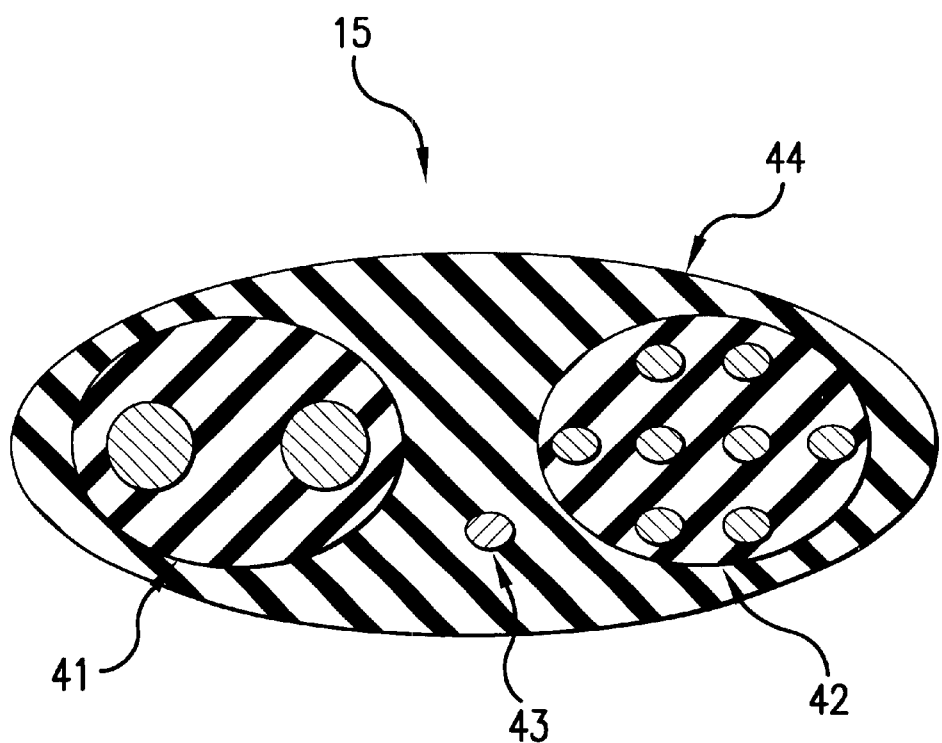
FIG. 4 is a cross-sectional view of a composite power/network cable device according to one embodiment of the present invention.

FIG. 4 illustrates a preferred embodiment of the Composite Power/Network Cable 15. CPNC 15 is made up of a commercially available two conductor (power and ground) wire 41 with the capacity (preferably 18 to 16 gauge stranded) to carry 12V DC current. Ethernet cable 42 is a 2 to 4 wire twisted pair conductor terminated by RJ45 jacks; alternatively, cable 42 may be implemented by another network standard as technology may advance. Network cable 42 and power wire 41 are preferably bundled into a single molded protective sheath 44 for simplicity of handling. The composite cable 15 is split at each end with the network data signal conductors having standard RJ45 modular male connectors at each end, and the 12V power conductors having standard male low voltage DC power plugs at each end. To ensure reliability under potentially rough handling conditions in the classroom, the cable 15 is supported by a Kevlar/spectra strand 43 or other reinforcing strand(s).

The motherboard of the SCDs 13 would have regulator chips that develop slight alterations in the voltage obtained from the power conductor 41 as necessary for its various sub-components. This design simplifies the design of the CPNC power conductor because it requires only a single voltage output. Further, the connectors at each end of the CPNC 15 require only simple single pin coaxial connectors (such as Switchcraft #760 or similar) are required.

An enhanced CPNC would use multi-conductor wire for the power side of the CPNC. The multiple conductors would be dedicated to the various voltage requirements (e.g., +3,−3, +5,−5, etc.) of the sub-components of the motherboard. These various voltages would be supplied by a single regulator as part of the CPNC assembly. The power connector at each end of the power cable would be a multi-pin connector (e.g., RJ45 or similar inexpensive locking connector). The benefit of this option is that the SCD is further simplified and should result in additional assembly cost reductions. In the classroom this may be an advantage but it significantly reduces the probability of being able to use the SCDs with a portable power supply (which typically has a single voltage output). Additional considerations are that the PSNH would have to supply multiple voltages, thereby making its design more sophisticated and possibly more costly to assemble, and that the power and network connectors may fit the same jacks in the SCDs, and thus raising the possibility of improper connection.

FIGS. 5A–5C illustrate a Simplified Computing Device 13 (SCD) according to one preferred embodiment of the invention. The SCD 13 consists of a flat panel display screen 51, a keyboard 52, (a mouse or track pad being optional), a speaker and microphone (not shown), and a motherboard 53 with processor chip and sufficient RAM to run whatever operating system and other application software that may be necessary (including display memory). All components of the SCD are contained in a molded plastic housing. The SCD does not have a hard drive or other permanent data storage. It is networked to CADS server 11 and/or to DHCP server 21 through PSNH 12 or PSNH 12 and Hub/Switch 22, as shown in FIGS. 1 and 2. The SCD is connected to the PSNH 12 by CPNC 15 plugged into built-in jacks 54 on the SCD. As shown in FIG. 5C, the individual SCDs may be nested for facilitating transportation and storage.

The invention having been thus described, it will be apparent to those skilled in the art that the same may be varied in many ways without departing from the spirit and scope of the invention. For example, the specific configuration and design of the SCD can be varied by considerations of budget, component size, durability, aesthetic and ergonomics. For instance, the power regulator chip design makes it possible to power the SCDs in field situations from a 12V portable power source.

What is claimed is:

1. A computer system suitable for providing computer access to institutions, comprising:

a plurality of simplified computing devices (SCDs), each SCD consisting of a motherboard having a processor and RAM, a visual display, an input device, a low voltage power port for receiving a supply of low voltage DC operating power from an external source, and a network port for receiving a network data signal from an external server.

2. The computer system of claim 1, wherein said SCD is configured to be capable of nesting with other SCDs for storage and/or transportation purposes.

3. The computer system of claim 1, wherein said visual display is a flat panel screen display.

4. The computer system of claim 1, wherein said input device is a keyboard.

5. The computer system of claim 1, further comprising a composite power/network cable for providing both said low voltage DC operating power and said network data signal to said low voltage power port and said network port, respectively.

6. A computer system suitable for providing computer access to institutions, comprising:

a plurality of simplified computing devices (SCDs), each SCD consisting of a motherboard having a processor and RAM, a visual display, an input device, a low voltage power port for receiving a supply of low voltage DC operating power from an external source, and a network port for receiving a network data signal from an external server; and a power supply/network hub which receives line power, converts the line power to conditioned low voltage DC power, and transmits the conditioned low voltage DC power to the power port of said simplified computing devices, and which receives at an input network port thereof a network data signal and distributes said network data signal over a plurality of network output ports to said simplified computing devices.

7. The computer system of claim 6, further comprising a DHCP server and a hub/switch device for networking multiple simplified computing devices to said DHCP server.

8. The computer system of claim 1, wherein said low voltage power port receives DC power from a portable rechargeable back-up power supply.

9. A method of providing computer access in an institutional environment, comprising the steps of:

providing a plurality of simplified computing devices, each consisting of a motherboard with a processor and RAM, a visual display, and an input device;

connecting said plurality of simplified computing devices to a power supply/network hub for providing to said devices a low voltage DC power supply and network data signals; and connecting said power supply/network hub to an application/data server which provides said network data signals and to a source of power which is used by said hub to develop said low voltage DC power supply.

* * * * *